US009519684B2

(12) United States Patent
Xu (10) Patent No.: US 9,519,684 B2
(45) Date of Patent: Dec. 13, 2016

(54) USER RECOMMENDATION METHOD AND A USER RECOMMENDATION SYSTEM USING THE SAME

(71) Applicant: Tencent Technology (Shenzhen) Company Limited, Shenzhen, Guangdong Province (CN)

(72) Inventor: Zhenyu Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 187 days.

(21) Appl. No.: 13/909,008

(22) Filed: Jun. 3, 2013

(65) Prior Publication Data

US 2014/0046939 A1  Feb. 13, 2014

(30) Foreign Application Priority Data

Aug. 8, 2012  (CN) .......................... 2012 1 0280588

(51) Int. Cl.
  *G06F 17/30* (2006.01)
  *G06Q 50/00* (2012.01)
(52) U.S. Cl.
  CPC ..... *G06F 17/3053* (2013.01); *G06F 17/30867* (2013.01); *G06Q 50/01* (2013.01)
(58) Field of Classification Search
  CPC .... G06F 17/30867; G06Q 10/10; G06Q 30/02
  (Continued)

(56) References Cited

U.S. PATENT DOCUMENTS 8,688,796 B1 *  4/2014 Lavian et al. ................ 709/207
2007/0174304 A1 *  7/2007 Shrufi et al. .................. 707/100
(Continued)

FOREIGN PATENT DOCUMENTS

CN  101540739 A  9/2009
CN  102004788 A  4/2011
(Continued)

OTHER PUBLICATIONS

Tencent Technology, ISRWO, PCTCN2013076649, Sep. 5, 2013, 7 pgs.
Tencent Technology, IPRP, PCTCN2013076649, Feb. 10, 2015, 5 pgs.

*Primary Examiner* — Scott A Waldron
*Assistant Examiner* — Dongming Wang
(74) *Attorney, Agent, or Firm* — Morgan, Lewis & Bockius LLP (57) ABSTRACT

A user recommendation method for supporting a social networking application includes receiving a user recommendation triggering command from a user at a mobile terminal; generating a recommended candidate user list based on the user recommendation triggering command; reading user social networking quality data, and calculating a matching success rate for each user in the recommended candidate user list based on the user social networking quality data; and selecting at least one user with a highest matching success rate from the recommended candidate user list for recommendation. By implementing the user recommendation method, recommendation performance and recommendation efficiency in the social networking application are improved. In addition, a user recommendation system implemented with the user recommendation method is also provided.

14 Claims, 6 Drawing Sheets

(58) Field of Classification Search
USPC .......................................................... 707/732
See application file for complete search history.

(56) References Cited

U.S. PATENT DOCUMENTS

| | | |
|---|---|---|
| 2008/0294655 A1 | 11/2008 | Picault et al. |
| 2011/0191352 A1 | 8/2011 | Jones et al. |
| 2012/0036208 A1* | 2/2012 | Beisel ................. H04L 12/1895 |
| | | 709/206 |
| 2012/0296895 A1* | 11/2012 | Robinson et al. ............ 707/723 |
| 2013/0006765 A1* | 1/2013 | Lee ............................ 705/14.53 |
| 2014/0282212 A1* | 9/2014 | Shuster ................. G06F 3/0484 |
| | | 715/780 |

FOREIGN PATENT DOCUMENTS

| | | |
|---|---|---|
| CN | 102316046 A | 1/2012 |
| JP | 2002-320159 | 10/2002 |
| JP | 2010-035214 | 12/2010 |
| JP | 2012-141971 | 7/2012 |

\* cited by examiner

USER RECOMMENDATION METHOD AND A USER RECOMMENDATION SYSTEM USING THE SAME

TECHNICAL FIELD

This application claims priority to Chinese Patent Application No. 201210280588.1, entitled "USER RECOMMENDATION METHOD AND A USER RECOMMENDATION SYSTEM USING THE SAME," filed on Aug. 8, 2012, which is incorporated by reference in its entirety.

BACKGROUND

The development of internet technologies, especially the development of mobile internet technologies, greatly changes the work and life of people. The creation of social networking applications (such as various instant messaging tools and community networks) makes the interpersonal communication more convenient and diversified. To stabilize and expand a user relationship chain, and to prevent losing social networking application users, various social networking applications usually provide a user recommendation function for recommending to a user other users that the user may be interested in.

A conventional user recommendation method includes a friend recommendation based on a six degree spatial theory and a friend recommendation based on common interest. The friend recommendation based on a six degree spatial theory refers to a theory in that a person can know a stranger via six people at most, and this type of user recommendation method relies on a user relationship chain. The friend recommendation based on common interest refers to a method that recommends users having the same interest, and this type of user recommendation method relies on personal information of the user. However, the conventional friend recommendation method based on a six degree spatial theory requires a complex six-degree relationship calculation process. Further, in the friend recommendation method based on common interest, the establishment of an interest graph model is complex. Therefore, implementation of the conventional user recommendation method is complex, and the recommendation performance and efficiency thereof are not high.

SUMMARY

In view of the problem of complex implementation, it is necessary to provide a user recommendation method capable of improving recommendation performance and efficiency.

A user recommendation method for supporting a social networking application includes:

at a computer having one or more processors and memory for storing one or more programs to be executed by the processors:

receiving a user recommendation triggering command from a user at a mobile terminal;

generating a recommended candidate user list according to the user recommendation triggering command;

reading user social networking quality data, and calculating a matching success rate for each user in the recommended candidate user list based on the user social networking quality data;

selecting at least one user with a highest matching success rate from the recommended candidate user list for recommendation; and returning information about the selected user to the mobile terminal for display to the user at the mobile terminal.

In addition, a user recommendation system implemented with the user recommendation method and capable of improving recommendation performance and efficiency is also provided.

A user recommendation system for supporting a social networking application includes:

one or more processors;

memory for storing one or more programs to be executed by the processors;

a command acquisition module, configured to receive a user recommendation triggering command from a user at a mobile terminal;

a candidate list generation module, configured to generate a recommended candidate user list according to the user recommendation triggering command;

a matching success rate calculation module, configured to read user social networking quality data, and calculate a matching success rate for each user in the recommended candidate user list based on the user social networking quality data; and a user recommendation module, configured to select at least one user with a highest matching success rate from the recommended candidate user list for recommendation and return information about the selected user to the mobile terminal for display to the user at the mobile terminal.

In the user recommendation method and system, the matching success rate for each user in the recommended candidate user list is calculated according to the user social networking quality data, and at least one user with a highest matching success rate is recommended. Establishment of the data model of the user social networking quality data is simpler than that of the interest graph model, and the calculation of the matching success rate is simpler than the calculation of the six-degree relationship. Therefore, the user recommendation method and system in accordance to the present invention are simple to implement, and can improve recommendation performance and efficiency.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
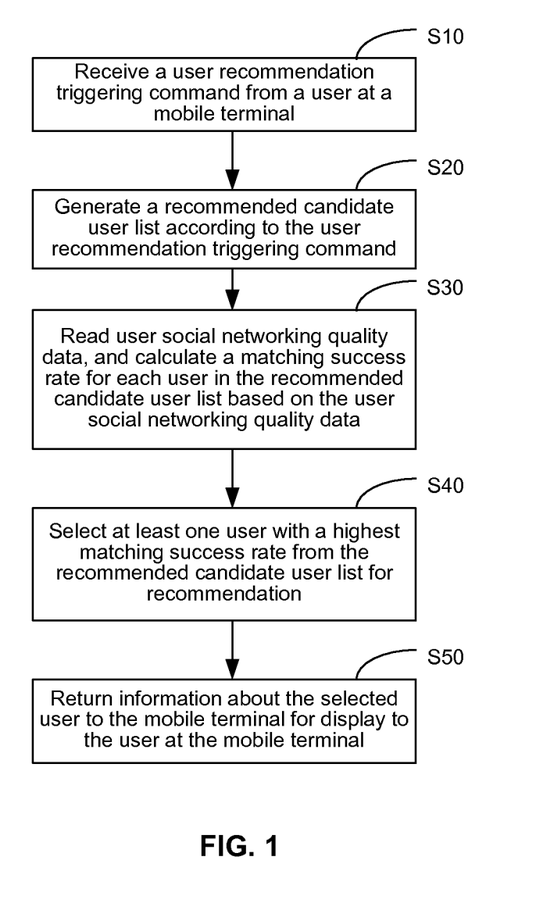
FIG. 1 is a schematic flow chart of a user recommendation method for supporting a social networking application in some implementations of the present invention.

As shown in FIG. 1, a user recommendation method in some implementations of the present invention includes the following steps:

Step S10: Receive a user recommendation triggering command from a user at a mobile terminal.

In some implementations, the user recommendation triggering command is received in at least one of the following manners: receiving an instruction of clicking a preset physical button or a virtual button of the mobile terminal; receiving an operation of shaking the mobile terminal, and generating a user recommendation triggering command.

Step S20: Generate a recommended candidate user list according to the user recommendation triggering command.

In some implementations, in Step S20, the recommended candidate user list is generated in at least one of the following manners:

(1) Generate the candidate recommendation list based on operation time corresponding to an operation on a mobile terminal, where the recommended candidate user list includes users whose time difference of the operation time is within a set range.

In some implementations, the operation on the mobile terminal is received, the user recommendation triggering command is generated, and the operation time corresponding to the operation is recorded. The operation on the mobile terminal may be shaking or flipping the mobile terminal. A client end may upload the operation time corresponding to the operation of a current user to a server, and the server receives operation time corresponding to operations of all users, and recommends a user whose time difference of the operation time is within a set range (such as 0.5 S) to the current user.

(2) Generate the recommended candidate user list based on a geographic location of a mobile terminal, where the recommended candidate user list includes users whose geographic locations belonging to a same area.

In some implementations, a client end may receive a current geographic location of a user, and upload the geographic location to a server. The server receives the geographic locations uploaded by all mobile terminals after a recommended user acquisition command is triggered, and obtains a user belonging to the same area as the current user according to the geographic location. Further, the server may receive users whose distances to the geographic location of the current user are within the set range (such as 100 meters) according to the received geographic locations, generate a recommended candidate user list according to the obtained users, and deliver the recommended candidate user list to the client end of the current user.

(3) Generate the recommended candidate user list according to uploaded information, where the recommended candidate user list includes users randomly extracted from the uploaded information.

In some implementations, the uploaded information may be friend-making information, personal information of a user, and comment information of a user upon some network application. The friend-making information may include partial personal information and friend-making content input by a user in the social network for making friends through matching. The client end may upload the information to the server. The server receives information uploaded by all client ends. For each current user, after receiving a recommended user acquisition command uploaded by the client end of the current user, the server may randomly select multiple other users to generate a recommended candidate user list for the current user, and send the recommended candidate user list to the client end of the current user.

Further, after multiple other users are randomly selected, attribute information of the randomly selected users can be received, where the attribute information includes the location area, age, and comment information of a user. A preset number of users with attribute information matching the current user may be extracted according to the attribute information of the users, and are used for generating a recommended candidate user list. For example, users belonging to a preset age group are extracted from the randomly selected users, and are used for generating a recommended candidate user list.

Step S30: Read user social networking quality data, and calculate a matching success rate of each user in the recommended candidate user list according to the user social networking quality data.

In some implementations, the user social networking quality data includes at least one of user personal data, user behavior data, and pattern data to establish a social relationship. The user personal data includes at least one of the following: whether avatar data is available, whether signature data is available, whether area information is available, and whether the user is a popular login user; the user behavior data includes at least one of the following: whether the user is set as a bad user, a success rate of the user to establish the social relationship establishment, and whether the user is a popular social user; and the pattern data to establish a social relationship includes at least one of the following: a pattern to establish the social relationship and a content detailed degree of interaction information.

In some implementations, the server stores user social networking quality data of all the users. The server makes statistics on social behavior information of the users, and updates the social networking quality data of each user. The user personal data may be obtained according to the personal information submitted by the user. The user behavior data and the pattern data to establish a social relationship may be generated according to the social behavior information obtained through statistics.

In some implementations, the step of calculating the matching success rate for each user in the recommended candidate user list according to the user social networking quality data in step S30 includes: generating a user score in the recommended candidate user list according to the user social networking quality data; and calculating the matching success rate for each user in the recommended candidate user list by using the Bayesian method and based on the user score.

In some implementations, a data model including the user personal data, the user behavior data, and the pattern data to establish a social relationship may be built. The server reads the social networking quality data of each user in the recommended candidate user list, and grades each user according to the user social networking quality data. For example, a user gets a higher score if the user personal data is more detailed, the success rate of social relationship establishment is higher, and the user is a popular social user.

Further, in some implementations, the step of generating the user score in the recommended candidate user list based on the user social networking quality data includes: reading preset weights corresponding to the user personal data, user behavior data, and pattern data to establish a social relationship respectively; and generating the user score in the recommended candidate user list according to the user personal data, the user behavior data, the pattern data to establish the social relationship, and the respective corresponding preset weights.

In some implementations, weights corresponding to the three data models, i.e., the user personal data, the user behavior data, and the pattern data to establish the social relationship, may be set in advance. When each user in the recommended candidate user list is graded, the three data models may be graded first. Further, after combining the three data models with the respective corresponding weights, the user is graded comprehensively, thereby generating the user score for each user in the recommended candidate user list.

Figure 2:
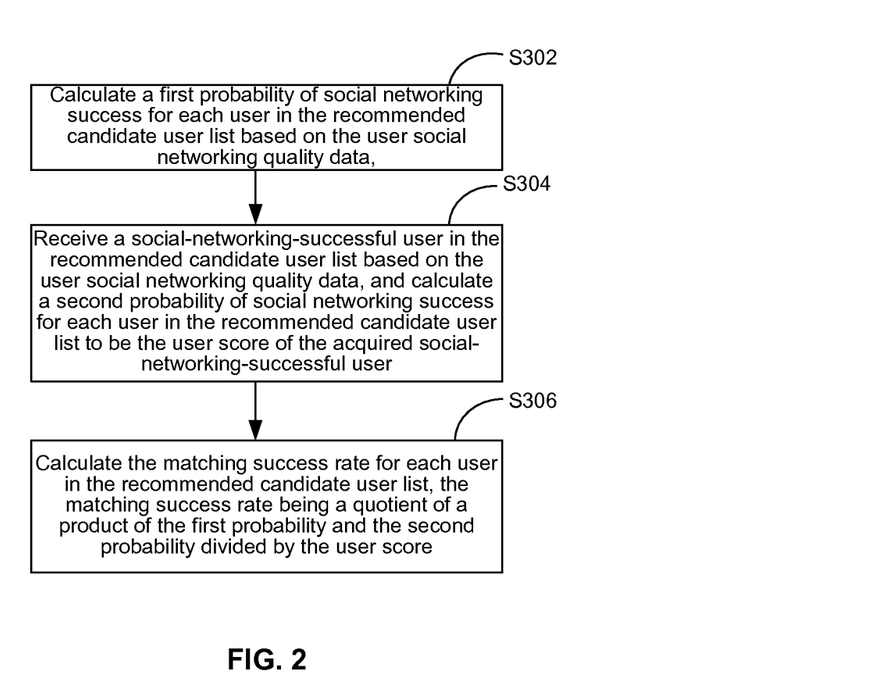
FIG. 2 is a flow chart of a method for calculating a matching success rate for each user in a recommended candidate user list using a Bayesian method in some implementations of the present invention.

In some implementations, as shown in FIG. 2, a specific process of calculating a matching success rate for each user in the recommended candidate user list by using a Bayesian method and based on the user score includes the following steps:

Step S302: Calculate a first probability of social networking success for each user in the recommended candidate user list based on the user social networking quality data, Step S304: Receive a social-networking-successful user in the recommended candidate user list based on the user social networking quality data, and calculate a second probability of social networking success for each user in the recommended candidate user list to be the user score of the received social-networking-successful user.

Step S306: Calculate the matching success rate for each user in the candidate recommendation user list, the matching success rate being a quotient of a product of the first probability and the second probability divided by the user score.

In some implementations, it may defined that UserSocialQuantity=(UserInfo, UserBehave, UserGreet), where UserSocialQuantity represents the user social networking quality data model, UserInfo represents the user personal data, UserBehave represents the user behavior data, UserGreet represents the pattern data to establish the social relationship. It is also defined that SocialResult=[success, fail], where success represents that matching is successful, and fail represents that matching is failed.

Further, the matching success rate for each user in the recommended candidate user list is calculated according to the following Bayesian formula:

$$P(SocialResult = \text{success} \mid UserSocialQuantity) = \frac{P(UserSocialQuantity \mid SocialResult = \text{success}) * P(SocialResult = \text{success})}{P(UserSocialQuantity)}$$

P(SocialResult=success|UserSocialQuantity) represents a probability of user matching success (i.e., the matching success rate of the user) in a user social networking quality model, P(UserSocialQuantity) represents grading the user (that is, the user score) according to the social networking quality data of the user, P(UserSocialQuantity|SocialResult=success) represents the second probability of social networking success for each user in the recommended candidate user list to be the user score of the received social-networking-successful user, and P(SocialResult=success) represents the first probability of social networking success for each user in the recommended candidate user list.

In some implementations, a probability of matching success between each user in the recommended candidate user list and the current user is estimated according to the historical data of the social networking quality data of each user stored in the server, which is simple and easy to implement. Therefore, recommendation performance and efficiency can be improved.

Step S40: Select at least one user with a highest matching success rate from the recommended candidate user list for recommendation.

Step S50: Return information about the selected user to the mobile terminal for display to the user at the mobile terminal.

In some implementations, after the matching success rate of each user in the recommended candidate user list is calculated, the users are ordered in sequence based on the matching success rate, and a preset number of users ranked higher are selected for recommendation. Further, the server may deliver the user information ranked higher to the client end that triggers the recommended user acquisition command, and the user information is displayed in an application interface of the client end in the form of a list. Further, the user may select some user from the displayed recommended users, and sends a message to the selected user.

Figure 3:
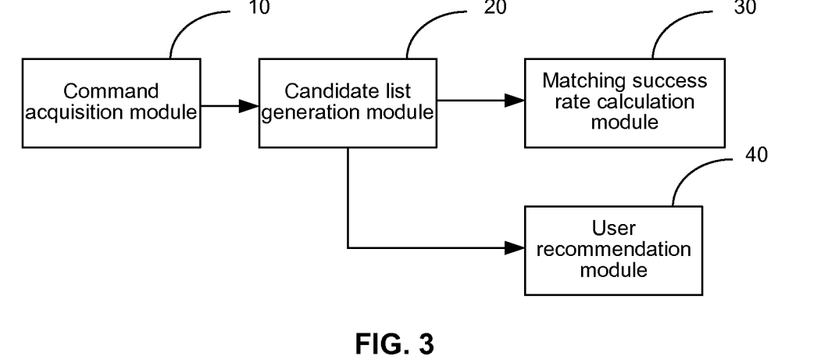
FIG. 3 is a schematic structural diagram of a user recommendation system in some implementations of the present invention.

As shown in FIG. 3, in some implementations, a user recommendation system includes a command acquisition module 10, a candidate list generation module 20, a matching success rate calculation module 30, and a user recommendation module 40.

The command acquisition module 10 is configured to receive a user recommendation triggering command.

In some implementations, the command acquisition module 10 receives the user recommendation triggering command in at least one of the following manners: receiving an instruction of clicking a preset physical button or a virtual button; or receiving an operation of shaking a mobile terminal, and generating a user recommendation triggering command.

The candidate list generation module 20 is configured to generate a recommended candidate user list according to the user recommendation triggering command.

In some implementations, the candidate list generation module 20 generates the recommended candidate user list in at least one of the following manners:

(1) Generate the candidate recommendation list based on operation time corresponding to an operation on a mobile terminal, where the recommended candidate user list includes users whose time difference of the operation time is within a set range.

In some implementations, the operation on the mobile terminal is received, the user recommendation triggering command is generated, and the operation time of the operation is recorded. The operation on the mobile terminal may be shaking or flipping the mobile terminal. A client end may upload the operation time corresponding to the operation of a current user to a server, and the candidate list generation module 20 of the server receives operation time corresponding to operations of all users, and recommends a user whose time difference of the operation time is within a set range (such as 0.5 S) to the current user.

(2) Generate the recommended candidate user list based on a geographic location of a mobile terminal, where the recommended candidate user list includes users whose geographic locations belonging to the same area.

In some implementations, a client end may receive a current geographic location of a user, and upload the geographic location to a server. The candidate list generation module 20 of the server receives the geographic locations uploaded by all mobile terminals after a recommended user acquisition instruction is triggered, and obtains a user belonging to the same area as the current user according to the geographic location. Further, the candidate list generation module 20 may receive users whose distances to the geographic location of the current user are within the set range (such as 100 meters) according to the received geographic locations, generate a recommended candidate user list according to the obtained users, and deliver the recommended candidate user list to the client end of the current user.

(3) Generate the recommended candidate user list based on the uploaded information, where the recommended candidate user list includes users randomly extracted from the uploaded information.

In some implementations, the uploaded information may be friend-making information, personal information of a user, and comment information of a user upon some network application. The friend-making information may include partial personal information and friend-making content input by a user in the social network for making friends through matching. The client end may upload the information to the server. The candidate list generation module 20 of the server receives information uploaded by all client ends. For each current user, after receiving a recommended user acquisition command uploaded by the client end of the current user, the candidate list generation module 20 of the server may randomly select multiple other users to generate a recommended candidate user list for the current user, and send the recommended candidate user list to the client end of the current user.

Further, after multiple other users are randomly selected, attribute information of the randomly selected users can be received, where the attribute information includes the location area, age, and comment information of a user. A preset number of users with attribute information matching the current user may be extracted based on the attribute information of the users, and are used for generating a recommended candidate user list. For example, users belonging to a preset age group are extracted from the multiple randomly selected users, and are used for generating a recommended candidate user list.

The matching success rate calculation module 30 is configured to read user social networking quality data, and calculate a matching success rate of each user in the recommended candidate user list according to the user social networking quality data.

In some implementations, the user social networking quality data includes at least one of user personal data, user behavior data, and pattern data to establish a social relationship. The user personal data includes at least one of the following: whether avatar data is available, whether signature data is available, whether area information is available, and whether the user is a popular login user; the user behavior data includes at least one of the following: whether the user is set as a bad user, a success rate of social relationship establishment, and whether the user is a popular social user; and the data about an establishment manner of social relationship includes at least one of the following: a pattern to establish social relationship and a content detailed degree of interaction information.

In some implementations, the server stores user social networking quality data of all the users. The server makes statistics on social behavior information of the users, and updates the social networking quality data of each user. The user personal data may be obtained according to the personal information submitted by the user. The user behavior data and the pattern data to establish a social relationship may be established according to the social behavior information obtained through statistics.

Figure 4:
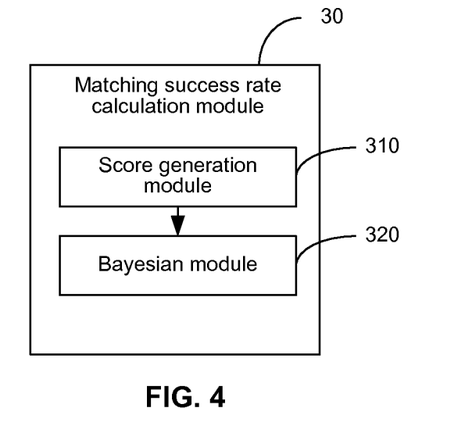
FIG. 4 is a schematic structural diagram of a matching success rate calculation module in some implementations of the present invention.

In some implementations, as shown in FIG. 4, the matching success rate calculation module 30 further includes a score generation module 310 and a Bayesian module 320.

The score generation module 310 is configured to generate a user score in the recommended candidate user list according to the user social networking quality data.

The Bayesian module 320 is configured to calculate the matching success rate of each user in the recommended candidate user list by using a Bayesian method and based on the user score.

In some implementations, a data model including the user personal data, the user behavior data, and the pattern data to establish a social relationship may be built. The score generation module 310 reads the social networking quality data of each user in the recommended candidate user list, and grades each user according to the user social networking quality data. For example, a user gets a higher score if the user personal data is more detailed, the success rate of social relationship establishment is higher, and the user is a popular social user.

Further, in some implementations, the score generation module 310 reads preset weights corresponding to the user personal data, user behavior data, and pattern data to establish a social relationship respectively; and generates the user score in the recommended candidate user list according to the user personal data, the user behavior data, the pattern data to establish a social relationship, and the respective corresponding preset weights.

In some implementations, the respective preset weights corresponding to the three data models, i.e., the user personal data, the user behavior data, and the pattern data to establish a social relationship, may be set in advance. When grading each user in the recommended candidate user list, the score generation module 310 first respectively grades the three data models. Further, after combining the three data models with the respective corresponding preset weights, the user can be graded comprehensively, thereby generating the user score in the recommended candidate user list.

Figure 5:
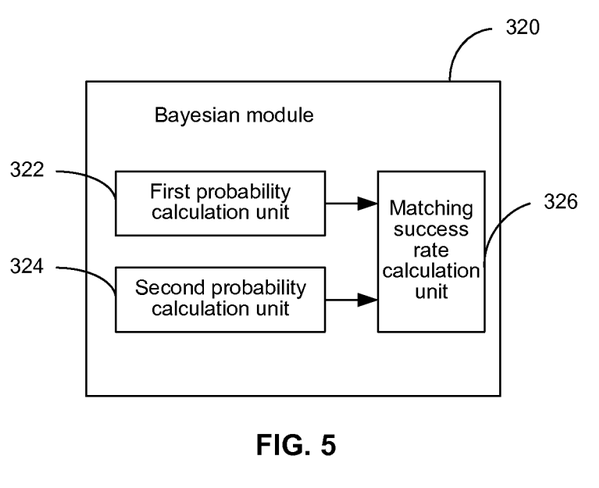
FIG. 5 is a schematic structural diagram of a Bayesian module in some implementations of the present invention.

In some implementations as shown in FIG. 5, the Bayesian module 320 further includes a first probability calculation unit 322, a second probability calculation unit 324, and a matching success rate calculation unit 326.

The first probability calculation unit 322 is configured to calculate a first probability of social networking success for each user in the recommended candidate user list based on the user social networking quality data.

The second probability calculation unit 324 is configured to receive a social-networking-successful user in the recommended candidate user list based on the user social networking quality data, and calculate a second probability of social networking success for each user in the recommended candidate user list to be the user score of the received social-networking-successful users.

The matching success rate calculation unit 326 is configured to calculate the matching success rate of a user in the candidate recommendation list, the matching success rate being a quotient of a product of the first probability and the second probability divided by the user score.

In some implementations, a probability of matching success between each user in the recommended candidate user list and the current user is estimated according to the historical data of the social networking quality data of each user stored in the server, which is simple and easy to implement. Therefore, recommendation performance and efficiency can be improved.

The user recommendation module 40 of FIG. 3 is configured to select at least one user with a highest matching success rate from the recommended candidate user list for recommendation.

In some implementations, the user recommendation module 40 of FIG. 3 is configured to order the users in sequence based on the matching success rate, and select a preset number of users ranked higher for recommendation. Further, the user recommendation module 40 of FIG. 3 may deliver the user information ranked higher to the client end that triggers the recommended user acquisition command, and the user information is displayed in an application interface of the client end in the form of a list.

Figure 6:
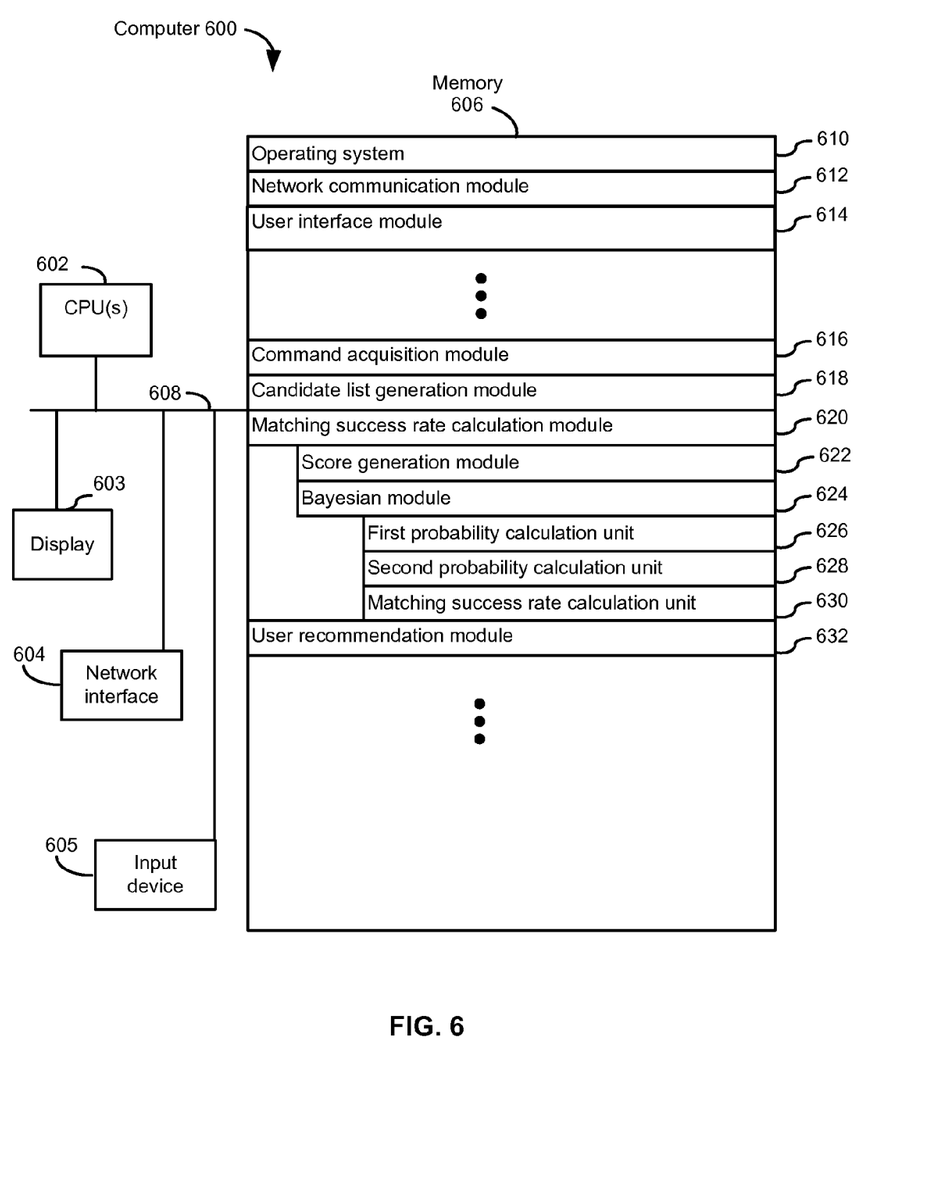
FIG. 6 is a block diagram illustrating an exemplary computer implementing the user recommendation method for supporting a social networking application running on a mobile terminal in accordance with some implementations of the present application.

FIG. 6 is a block diagram illustrating an exemplary computer 600 implementing the user recommendation method for supporting a social networking application running on a mobile terminal in accordance with some implementations of the present application. In some implementations, the mobile terminal and the computer 600 are one device, which may be a laptop, a smartphone, a tablet, etc. In some other implementations, the mobile terminal and the computer 600 are two distinct devices that are coupled together by a computer network (e.g., the Internet). In this case, the computer 600 is on the server-side of the network and the mobile terminal is on the client-side of the network. The computer 600 includes one or more processing units CPU(s) 602 (also herein referred to as processors), one or more network interfaces 604, one or more input devices 605, a display 603, memory 606, and one or more communication buses 608 for interconnecting these components. In some implementations, the one or more user input devices 605 include a keyboard, a mouse, a trackpad, and a touchscreen. The communication buses 608 optionally include circuitry (sometimes called a chipset) that interconnects and controls communications between system components.

The memory 606 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 or alternatively the non-volatile memory device(s) within the memory 606, comprises a non-transitory computer readable storage medium. In some implementations, the memory 606 or alternatively the non-transitory computer readable storage medium stores the following programs, modules and data structures, or a subset thereof:

- an operating system 610, which includes procedures for handling various basic system services and for performing hardware dependent tasks;
- a network communication module (or instructions) 612 for connecting the computer 600 with other devices (e.g., a remote server or client device) via one or more network interfaces 604 (wired or wireless) and a communication network (e.g., the Internet);
- a user interface module 614 for displaying different user interface controls (e.g., textboxes or dropdown lists or push buttons) as well as data and images in accordance with user input;
- a command acquisition module 616 configured to receive a user recommendation triggering command;
- a candidate list generation module 618 configured to generate a recommended candidate user list according to the user recommendation triggering command;
- a matching success rate calculation module 620 configured to read user social networking quality data, and calculate a matching success rate for each user in the recommended candidate user list based on the user social networking quality data;
- a user recommendation module 632 configured to select at least one user with a highest matching success rate from the recommended candidate user list for recommendation.

The matching success rate calculation module 620 further includes:

- a score generation module 622 configured to generate a user score for each user in the recommended candidate user list based on the user social networking quality data; and
- a Bayesian module 624 configured to calculate the matching success rate for each user in the recommended candidate user list using a Bayesian method based on the user score, and further includes:
  - a first probability calculation unit 626 configured to calculate a first probability of social networking success for each user in the recommended candidate user list based on the user social networking quality data;
  - a second probability calculation unit 628 configured to receive social-networking-successful users in the recommended candidate user list based on the user social networking quality data, and calculate a second probability of social networking success for each user in the recommended candidate user list to be the user score of the received social-networking-successful users; and
  - a matching success rate calculation unit 630 configured to calculate the matching success rate for each user in the candidate recommendation list, the matching success rate being a quotient of a product of the first probability and the second probability divided by the user score.

In the user recommendation method and system of the present invention, the matching success rate of each user in the recommended candidate user list is calculated according to the user social networking quality data, and at least one user with a highest matching success rate is recommended. Establishment of the data model of the user social networking quality data is simpler than that of the interest graph model, and the calculation of the matching success rate is simpler than the calculation of the six-degree relationship. Therefore, the user recommendation method and system are simple to implement, and can improve recommendation performance and efficiency.

Further, the matching success rate of each user in the recommended candidate user list is calculated according to the historical data of the user social networking quality data, the user with a higher matching success rate can better meet a user requirement, and can improve the recommendation quality, thereby improving the matching success rate after user recommendation.

Persons of ordinary skill in the art should understand that, all or a part of processes in the method according to the implementations may be accomplished by relevant hardware under instructions of a computer program. The program may be stored in a computer-readable storage medium. When the program is executed, the processes of the method according to the implementations of the present invention are performed. The storage medium may be a magnetic disc, an optical disk, a read-only memory (Read-Only Memory, ROM), or a random access memory (Random Access Memory, RAM).

The above implementations are merely detailed description of several implementation manners of the present invention, but shall not be construed as a limitation to the present invention. It should be noted that, for persons of ordinary skill in the art, modification and improvement made without departing from the idea of the present invention shall fall within the protection scope of the present invention. Therefore, the protection scope of the present invention is subject to the appended claims.

While particular implementations are described above, it will be understood it is not intended to limit the invention to these particular implementations. On the contrary, the invention includes alternatives, modifications and equivalents that are within the spirit and scope of the appended claims Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly represents otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A user recommendation method for supporting a social networking application, comprising:
   at a computer having one or more processors and memory for storing one or more programs to be executed by the processors:
   receiving a user recommendation triggering command from a user using the social networking application installed at a mobile terminal;
   generating a recommended candidate user list according to the user recommendation triggering command, wherein the recommended candidate user list includes a group of users that each perform the user recommendation triggering command using the social networking application installed at their respective mobile terminals within a predefined time window;
   reading user social networking quality data, and calculating a matching success rate for each user in the recommended candidate user list based on the user social networking quality data;
   selecting at least one user with a highest matching success rate from the recommended candidate user list for recommendation; and
   returning information about the selected user to the mobile terminal for display to the user at the mobile terminal.

2. The user recommendation method according to claim 1, wherein the recommended candidate user list is generated according to the user recommendation triggering command in at least one of the following manners:
   generating the recommended candidate user list based on operation time corresponding to an operation on a mobile terminal, wherein the recommended candidate user list comprises users whose time difference of the operation time is within a set range;

generating the recommended candidate user list based on a geographic location of a mobile terminal, wherein the recommended candidate user list comprises users whose geographic locations belong to a same area; and generating the recommended candidate user list based on uploaded information, wherein the recommended candidate user list comprises users randomly extracted from the uploaded information.

3. The user recommendation method according to claim 1, wherein the user social networking quality data comprises at least one of user personal data, user behavior data, and pattern data to establish a social relationship, wherein the user personal data comprises at least one of the following: whether avatar data is available, whether signature data is available, whether area information is available, and whether the user is a popular login user;

the user behavioral data comprises at least one of the following: whether the user is set as a bad user, a success rate of the user to establish the social relationship, and whether the user is a popular social user; and the pattern data to establish a social relationship comprises at least one of the following: a pattern to establish the social relationship and a content detailed degree of interaction information.

4. The user recommendation method according to claim 3, wherein calculating the matching success rate for each user in the recommended candidate user list based on the user social networking quality data further comprises:

generating a user score for each user in the recommended candidate user list based on the user social networking quality data; and calculating the matching success rate for each user in the recommended candidate user list using a Bayesian method based on the user score.

5. The user recommendation method according to claim 4, wherein generating the user score for each user in the recommended candidate user list based on the user social networking quality data further comprises:

reading preset weights corresponding to the user personal data, user behavior data, and pattern data to establish a social relationship, respectively; and generating the user score for each user in the recommended candidate user list based on the user personal data, the user behavior data, the pattern data to establish a social relationship, and the respective corresponding preset weights.

6. The user recommendation method according to claim 4, wherein calculating the matching success rate for each user in the recommended candidate user list using the Bayesian method based on the user score further comprises:

calculating a first probability of social networking success for each user in the recommended candidate user list based on the user social networking quality data;

receiving social-networking-successful users in the recommended candidate user list based on the user social networking quality data, and calculating a second probability of social networking success for each user in the recommended candidate user list to be the user score of the received social-networking-successful users; and calculating the matching success rate for each user in the recommended candidate user list, the matching success rate being a quotient of a product of the first probability and the second probability divided by the user score.

7. The user recommendation method according to claim 1, wherein a member of the group of users performs the user recommendation triggering command by shaking or flipping its mobile terminal to upload an operation time corresponding to the shaking or flipping of the mobile terminal.

8. A user recommendation system for supporting a social networking application, comprising:

one or more processors;

memory for storing one or more programs to be executed by the processors; and a plurality of program modules stored in the memory and to be executed by the one or more processors, the plurality of program modules including:

a command acquisition module, configured to receive a user recommendation triggering command from a user using the social networking application installed at a mobile terminal;

a candidate list generation module, configured to generate a recommended candidate user list according to the user recommendation triggering command, wherein the recommended candidate user list includes a group of users that each perform the user recommendation triggering command using the social networking application installed at their respective mobile terminals within a predefined time window;

a matching success rate calculation module, configured to read user social networking quality data, and calculate a matching success rate for each user in the recommended candidate user list based on the user social networking quality data; and a user recommendation module, configured to select at least one user with a highest matching success rate from the recommended candidate user list for recommendation and return information about the selected user to the mobile terminal for display to the user at the mobile terminal.

9. The user recommendation system according to claim 8, wherein the candidate list generation module generates the recommended candidate user list in at least one of the following manners:

generating the recommended candidate user list based on operation time corresponding to an operation on a mobile terminal, wherein the recommended candidate user list comprises users whose time difference of the operation time is within a set range;

generating the recommended candidate user list based on a geographic location of a mobile terminal, wherein the recommended candidate user list comprises users whose geographic locations belong to a same area; and generating the recommended candidate user list based on uploaded information, wherein the recommended candidate user list comprises users randomly extracted from the uploaded information.

10. The user recommendation system according to claim 8, wherein the user social networking quality data comprises at least one of user personal data, user behavior data, and pattern data to establish a social relationship;

the user personal data comprises at least one of the following: whether avatar data is available, whether signature data is available, whether area information is available, and whether the user is a popular login user;

the user behavioral data comprises at least one of the following: whether the user is set as a bad user, a success rate of the user to establish the social relationship establishment, and whether the user is a popular social user; and the pattern data to establish a social relationship comprises at least one of the following: a pattern to establish social relationship and a content detailed degree of interaction information.

11. The user recommendation system according to claim 10, wherein the matching success rate calculation module further comprises:
  a score generation module, configured to generate a user score for each user in the recommended candidate user list based on the user social networking quality data; and
  a Bayesian module, configured to calculate the matching success rate for each user in the recommended candidate user list using a Bayesian method based on the user score.

12. The user recommendation system according to claim 11, wherein the score generation module is further configured to read preset weights corresponding to the user personal data, user behavior data, and pattern data to establish a social relationship, respectively; and generate the user score for each user in the recommended candidate user list based on the user personal data, the user behavior data, the pattern data to establish a social relationship, and the respective corresponding preset weights.

13. The user recommendation system according to claim 11, wherein the Bayesian module further comprises:
  a first probability calculation unit, configured to calculate a first probability of social networking success for each user in the recommended candidate user list based on the user social networking quality data;
  a second probability calculation unit, configured to receive social-networking-successful users in the recommended candidate user list based on the user social networking quality data, and calculate a second probability of social networking success for each user in the recommended candidate user list to be the user score of the received social-networking-successful users; and
  a matching success rate calculation unit, configured to calculate the matching success rate for each user in the candidate recommendation list, the matching success rate being a quotient of a product of the first probability and the second probability divided by the user score.

14. The user recommendation system according to claim 8, wherein a member of the group of users performs the user recommendation triggering command by shaking or flipping its mobile terminal to upload an operation time corresponding to the shaking or flipping of the mobile terminal.

* * * * *